United States Patent
Yorimitsu

(10) Patent No.: US 6,243,790 B1
(45) Date of Patent: *Jun. 5, 2001

(54) METHODS AND APPARATUS FOR RE-ARRANGING LOGICAL DRIVES IN A DISK ARRAY APPARATUS

(75) Inventor: Keiichi Yorimitsu, Yokohama (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,755

(22) Filed: Mar. 25, 1997

(30) Foreign Application Priority Data

Sep. 27, 1996 (JP) .................................. 8-257067

(51) Int. Cl.⁷ .................................................. G06F 12/00
(52) U.S. Cl. .............................. 711/112; 711/114; 710/8
(58) Field of Search ................................... 711/114, 112, 711/170; 395/182.05, 828, 182.04; 714/6, 7; 710/8

(56) References Cited

U.S. PATENT DOCUMENTS

| | | | |
|---|---|---|---|
| 5,325,497 | * | 6/1994 | Jaffe et al. ............................ 711/114 |
| 5,615,352 | * | 3/1997 | Jacobson et al. ..................... 711/114 |
| 5,664,119 | * | 9/1997 | Jeffries et al. .................... 395/182.05 |
| 5,721,861 | * | 2/1998 | Ohizumi ............................... 711/114 |
| 5,751,936 | * | 5/1998 | Larson et al. .................... 395/182.05 |
| 5,784,702 | * | 7/1998 | Greenstein et al. ............. 395/182.05 |
| 5,809,224 | * | 9/1998 | Schultz et al. ........................ 711/170 |
| 5,822,782 | * | 10/1998 | Humlicek et al. .................... 711/114 |
| 5,835,694 | * | 11/1998 | Hodges ................................. 711/114 |
| 5,835,700 | * | 11/1998 | Carbonneau et al. ................. 714/44 |
| 5,875,063 | * | 2/1999 | Corrington et al. .................... 360/71 |

OTHER PUBLICATIONS

IBM TDB, "Apparatus to remove logical vs. physical drive management", vol. 33, No. 6A, Nov. 1990, pp. 188–189.*
Storage Dimensions, "Impact of Dynamic Growth and Reconfiguration in a Real–World Environment", [Online] Available: http://www.storagedimensions.com/product/dgrt-b.html, 1996.*
Rigney, S, "Bulletproof data", PC Magazine, v15 n21 (Dec. 3, 1996).*
Frank, A, "An Array can save the day", LAN Magazine, v11 n2 (Feb 1996).*

* cited by examiner

Primary Examiner—Do Hyun Yoo
Assistant Examiner—Yamir Encarnacion
(74) Attorney, Agent, or Firm—Greer, Burns & Crain, Ltd.

(57) ABSTRACT

Modern disk array apparatus are capable of providing a plurality of logical disks within one cabinet. The present invention provides a disk array apparatus in which logical disks can be easily re-arranged within the array, or added to the array. An array controller logically controls at least one disk apparatus as one logical disk. The array controller also changes positional information within the drive modules stored within the disk apparatus. Information is matched indicating the position of the relevant disk apparatus within the logical disk. Therefore, after transposition of a particular logical disk, a new logical disk can be accurately recognized.

2 Claims, 12 Drawing Sheets

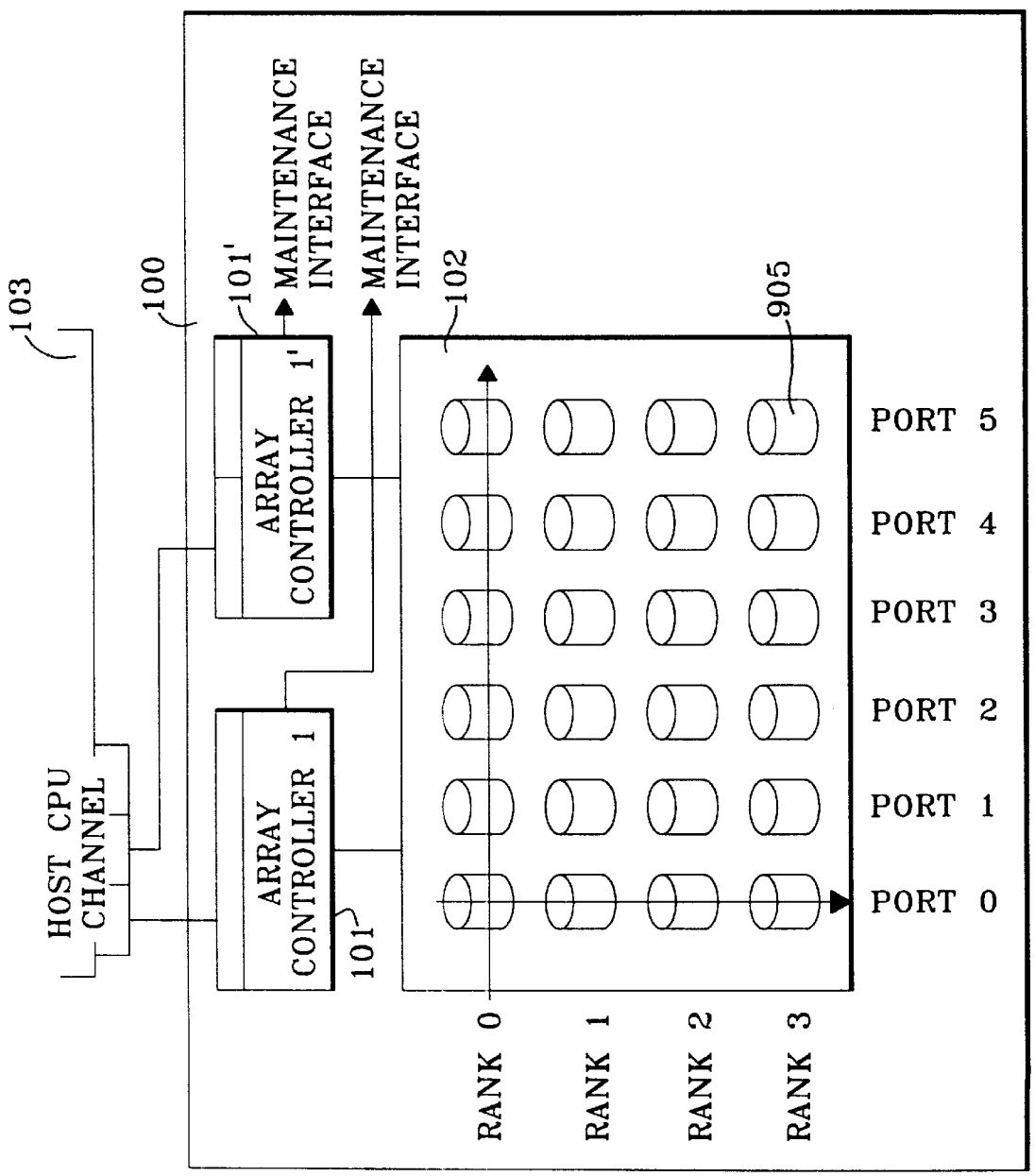

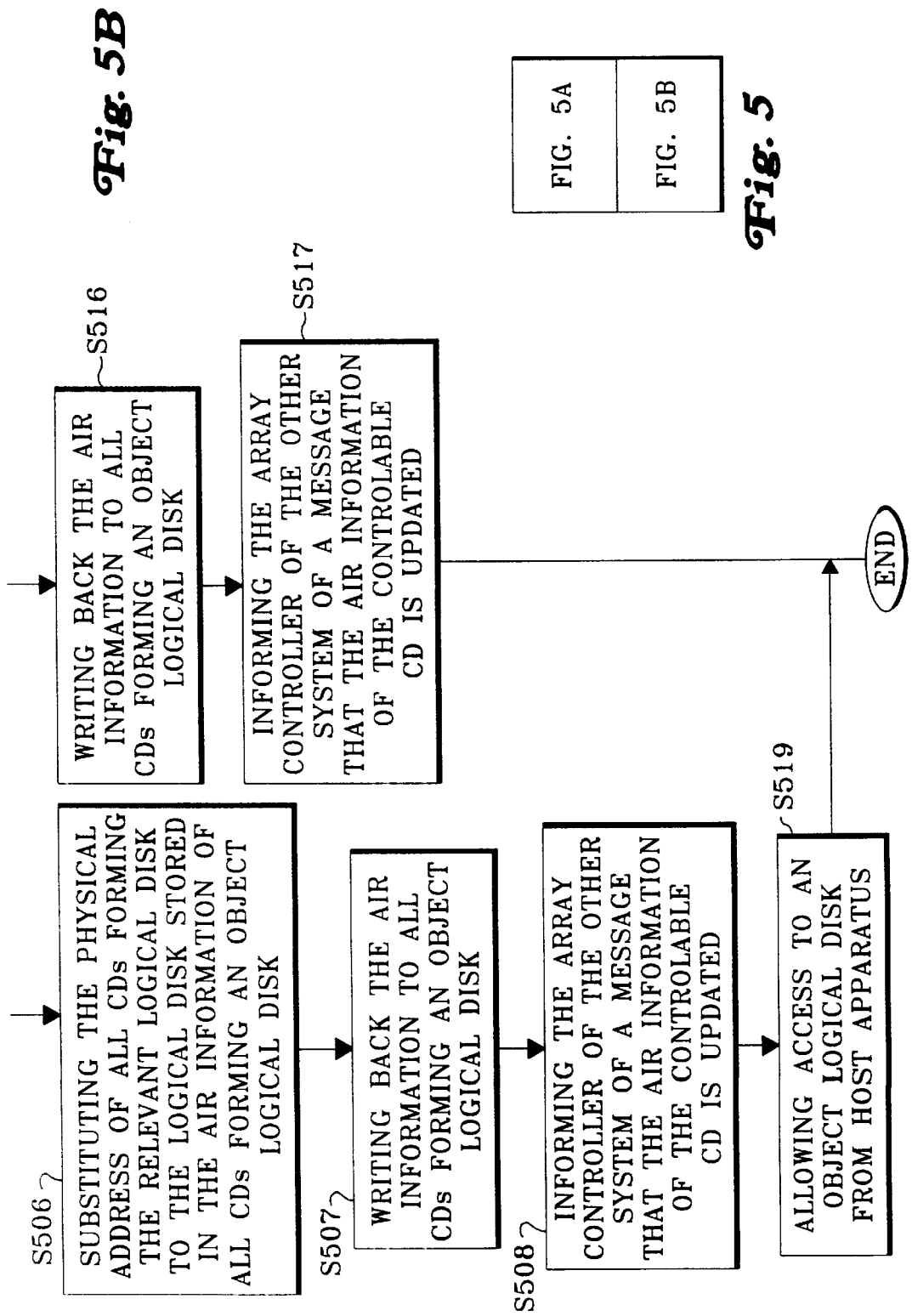

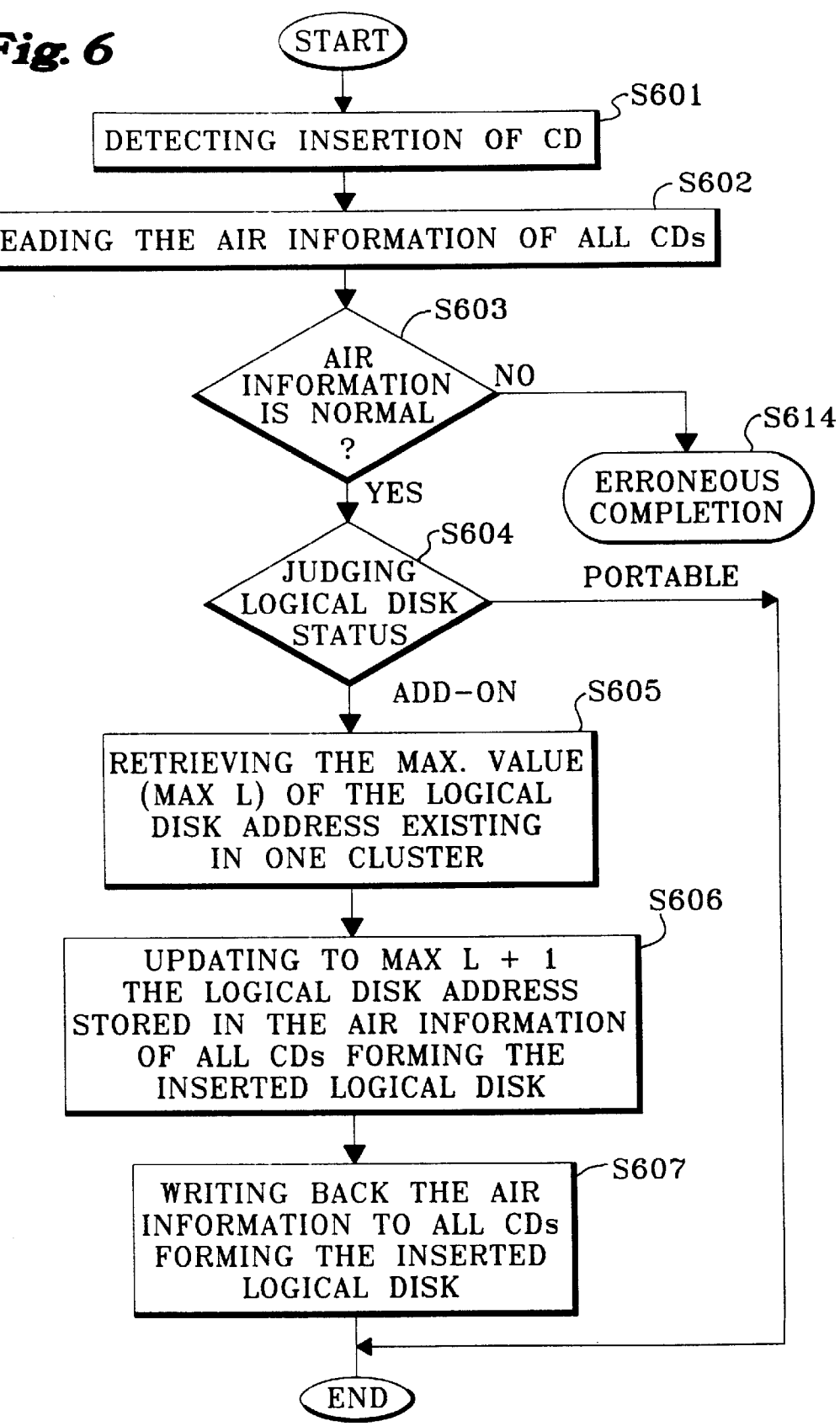

METHODS AND APPARATUS FOR RE-ARRANGING LOGICAL DRIVES IN A DISK ARRAY APPARATUS

This invention relates to disk arrays, and more particularly to disk arrays in which disk drives having different logical parameters can be easily transposed or rearranged in the array for testing purposes and the like.

BACKGROUND OF THE INVENTION

Modern disk arrays simultaneously operate a plurality of disk drives which are processed as a single disk unit through parallel combinations of units. This increases both performance and reliability are increased.

As a practical way to improve reliability, it has been recognized to provide an exclusive parity or hamming code disk within the disk array apparatus. Moreover, it is also known to provide a hot spare disk, so that even if a single disk develops a fault, processing can be done continuously without suspending the operation of the system.

In general, a plurality of magnetic disks are arranged in parallel within the disk array apparatus. Combinations of physical magnetic disks are grouped to form one or more logical disks. As to the combination method, several types have already been proposed. The respective types are called RAID (Redundant Array Of Inexpensive Disks) levels. For each RAID level, the control method of the disks combined as a logical disk is controlled by a different operation method.

The RAID levels are called RAID level 0 to RAID level 5. The concept of each RAID level and operating method are described in The RAID Book (The RAID Advisory Board, Inc. issued on Nov. 18, 1993).

Moreover, a disk array apparatus which allows coexistence of a plurality of types of logical disks within one drive module group has been developed. As seen in FIG. 1, a total of 24 disks, including six disks in the lateral direction and four disks in the vertical direction, are arranged in the matrix structure within one unit of the disk array apparatus.

In FIG. 1, the lateral arrangement of a drive module group 102 is called a rank. In general, one logical disk has a plurality of physical disks in the same rank.

The vertical arrangement is called a port. From the hardware point of view, data transfer may be realized independently for each port.

In FIG. 7A, an example of a logical disk assigning method is indicated. A device of rank(x)/port(y) is described as DVxy. The 24 devices are respectively assigned in such a manner that DV00–DV04 are defined as logical disk 0, while DV10–DV14 are logical disk 1, DV20–DV24 are logical disk 2 and DV30–DV34 are logical disk 3. HS-0, HS-1, HS-2 and HS-3 are assigned respectively as the hot spare disks. The hot spare disks are used to newly store data which was stored in a relevant physical disk when a fault is generated in the disk, disabling read and write operations of data in that disk. The data to be stored in the hot spare disks are reproduced from the contents of the other disks constituting a logical disk to which the relevant physical disks belong.

FIG. 7B shows the RAID level assigned to each logical disk in the structure explained above. In FIG. 7B, logical disks 0–3 are all set to RAID level 3 or RAID level 5.

FIG. 8A shows another example. In FIG. 8A, 24 devices are respectively assigned in such a manner that DV00–04 are defined as logical disk 0, DV10–DV11 as logical disk 1, DV12–DV13 as logical disk 2, DV14 as logical disk 3, DV20–DV22 as logical disk 4, DV23–DV24 as logical disk 5, DV30–31 as logical disk 6, and DV32–DV34 as logical disk 7. HS-0, HS-1, HS-2 and HS-3 are assigned respectively as hot spare disks. The function of the hot spare disks is similar to those of FIG. 7.

FIG. 8B shows the RAID level assigned to each logical disk in the structure described above. In FIG. 8B, the logical disk 0 is set to the RAID level 3 or 5, logical disks 1 and 2 to the RAID level 1, logical disk 3 and 4 to the RAID level 0, logical disks 5 and 6 to RAID level 1 and logical disk 7 to RAID level 0.

In the disk array apparatus of the structure explained above, particularly in the apparatus as shown in FIG. 8, a variety of logical disks of various RAID levels coexist. When such a structure is employed, a disk array controller cannot control the logical disks if the disk array apparatus does not accurately detect the layout of the logical disks. For example, in FIG. 8, DV10 to DV14 cannot be operated under the assumption that they are set to RAID level 3.

In order to prevent such an erroneous assumption, the position in the relevant drive module group for insertion of the relevant physical disk (referred to as "physical address") is recorded in each physical disk in the apparatus. Such information is generally known as AIR (Array Integrity Record) information. This AIR information is written in the factory before delivery.

The disk array apparatus inspects the physical address with reference to the AIR information recorded in the physical disk loaded therein. If mismatching between the actual inserting position and the physical address of the AIR information is detected, the relevant logical disk is disabled.

As explained above, erroneous recognition of logical disks resulting from erroneous insertion of a physical disk into an incorrect slot can be prevented. However, disk array apparatus developed in recent years is capable of providing a plurality of logical disks within one drive module group. In the disk array apparatus of the related art, an individual disk apparatus can be controlled on the basis of its physical position. Therefore, control of the logical disk also naturally depends on the physical position of the disks being correct. Accordingly, transposition or rearrangement of the logical disk within the apparatus has not been possible.

NEEDS, OBJECTS AND SUMMARY OF THE INVENTION

There is a need for a disk array apparatus in which disks can easily be transposed or re-arranged regardless of the logical disk of which they are a part for many reasons. First, it would allow a user to determine, when a fault is generated, if the fault lies in the disk apparatus itself or in its connection. Second, easy transposition of disks would allow a user to re-arrange the data structure without copying the logical disk, saving a great deal of time and money. Third, in the case of extending the logical disks by adding new logical disks or the like, such an apparatus would not restrict the physical address into which the disk must be inserted, allowing disks of any size to be inserted. As a result, production and stock of additional disks could be simplified, and productivity increased.

Accordingly, an object of this invention is to provide a new and improved disk array apparatus which easily enables transposition or re-arrangement of disks.

Another object is to provide a reliable and easily maintained disk array apparatus which allows for the addition of a variety of logical disks within a single apparatus and easy transposition of disks within the group of disks, even when the logical disks have different data formats and protocols. In fact, an object is to provide for accurate recognition of the logical designations for disks, at the time of their transposition, even if the relative position of a disk apparatus within the logical disk arrangement is changed.

In keeping with one aspect of the invention, a disk array includes a drive module group composed of a plurality of disk apparatus for storing data to be transferred to or from a host apparatus, and at least one disk apparatus for storing redundant data generated from the data stored in the data storing disk apparatus to be transferred to or from the host apparatus. Array controllers accept instructions issued by the host apparatus to analyze their content, operating the disk apparatus depending on the instruction issued by the host apparatus, or requesting data transfer and controlling data transfer between the host apparatus and disk apparatus. Structure information including position in the drive module of the disk to be accessed is recorded in the disk apparatus.

The drive module group includes a plurality of disk apparatus which include a plurality of designated physical disks controlled by the array controller as a logical disk. The array controller inhibits use of the relevant disk apparatus when the structure information recorded in the relevant disk apparatus mismatches the actual condition of the disk apparatus, and can change the position information stored in the drive module stored in the disk apparatus.

Combination information (information indicating position of the relevant disk apparatus to be logically controlled as one disk) is included in the structure information recorded in the disk apparatus. Therefore, even when the relative position of the disk apparatus forming a logical disk is changed, the structure of the logical disk and layout of the disk apparatus can be detected accurately. In this manner, a highly reliable disk array apparatus can be realized.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 1 is a structure diagram of a computer system including a disk array apparatus;

FIG. 6 is a processing flow chart of the array controller when a logical disk is newly inserted;

DETAILED DESCRIPTION

Figure 9:
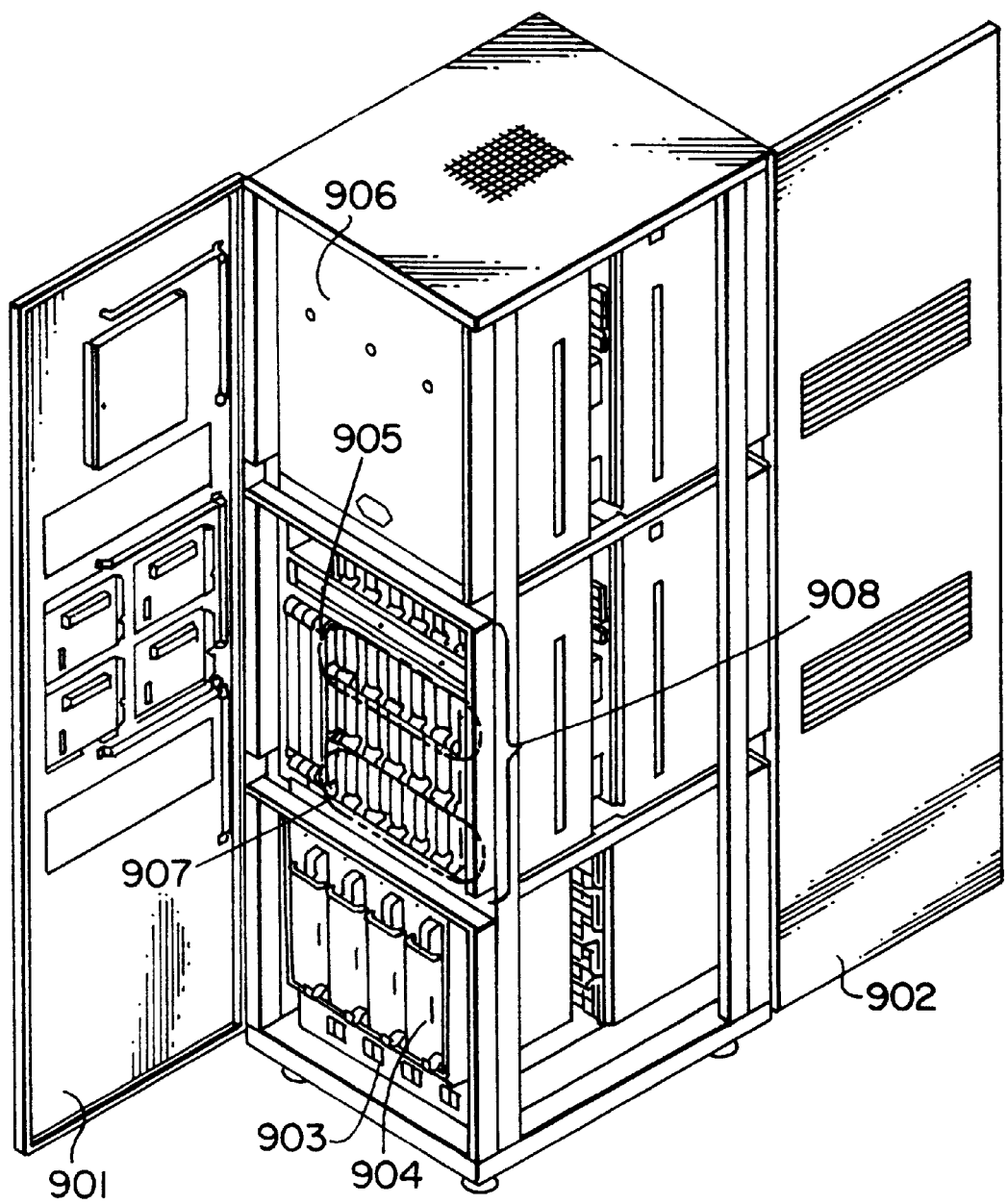
FIG. 9 is a perspective view showing the disk array apparatus as a whole.

FIG. 9 is a perspective view showing an entire disk array apparatus. Like elements are designated by like reference numerals throughout the drawings. The disk array apparatus is divided into three stages in the vertical direction and each stage is divided into a front half section and a rear half section. The front and rear half sections of an upper stage and the front and rear half sections of the intermediate stages are provided respectively with a drive module group (hereinafter called a cluster 908), and one cabinet is provided with four clusters in total. The lower stage is provided with a power supply switch 903 and a power supply unit 904 in the front and rear half sections. The power supply unit 904 of the front half section supplies electrical power to the clusters provided in the front half sections of the intermediate and upper stages, while the power supply unit in the rear half section supplies power to the clusters provided in the rear half section of the intermediate and upper stages.

Each cluster 908 is covered with a cover 906 and the upper, intermediate and lower stages are completely covered with a front surface door 901 and a rear surface door 902. One cluster 908 is divided into four stages. Each stage is called a rank 907 and one cluster is constituted by four ranks. Each rank has six card drives (hereinafter called CD) 905. Each CD 905 includes one physical disk apparatus.

Figure 10A:
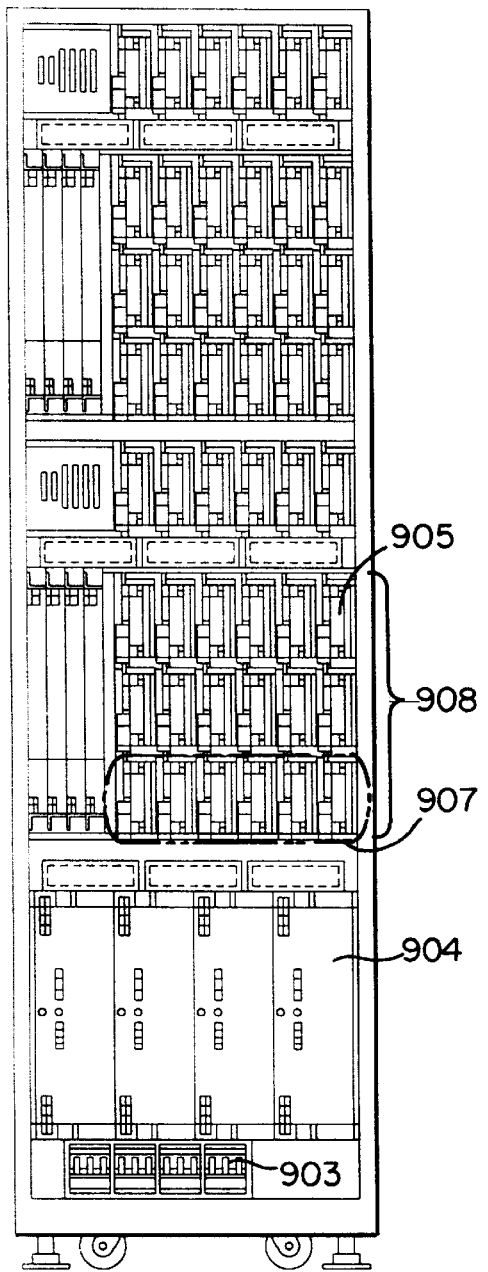
FIGS. 10A and 10B are a front elevation and a side elevation view, respectively, of the disk array apparatus as a whole.
Figure 10B:
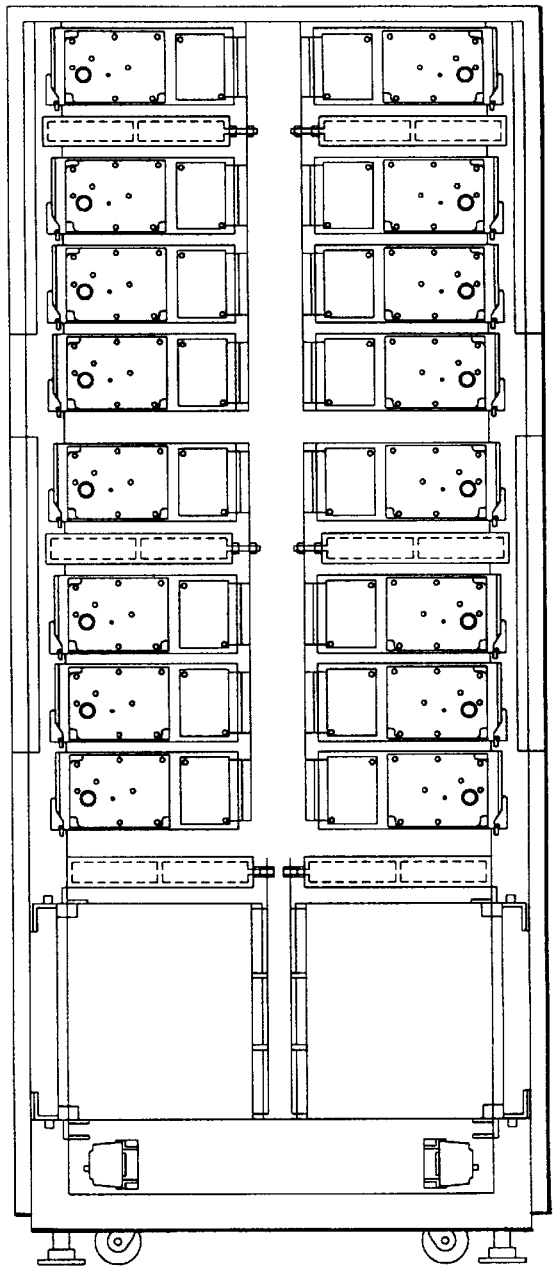

FIG. 10A is a front elevation view of the disk array apparatus when the front surface door 901 is removed. FIG. 10B is a side elevation view of the disk array apparatus when the side surface door (not illustrated) is removed.

Figure 11:
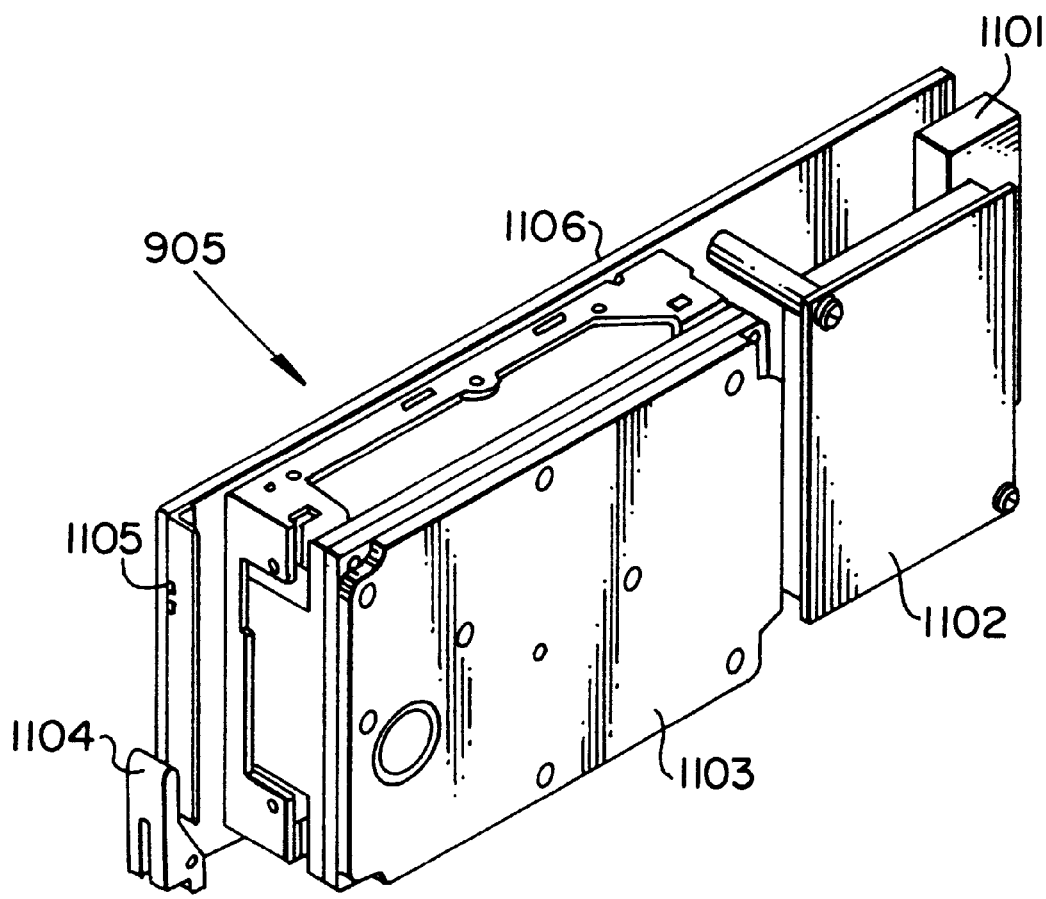
FIG. 11 is a perspective view of a card drive.

FIG. 11 is a perspective view of a CD 905. The card drive CD 905 can be inserted or removed freely to/from the slot of the disk array apparatus while the power source is being supplied.

The CD has a connector 1101 for electrical connection with the cabinet, a converter 1102, a disk apparatus 1103, an injector 1104 for assisting with insertion and removal of the CD, and an LED 1105 for indicating the status of the disk apparatus. The LED 1105 is mounted on an electrical wire card 1106.

Within the disk apparatus, a plurality of blocks of equal length exist and block numbers are assigned to the blocks from the number 0, in ascending order. In this embodiment, a disk drive having a capacity of about 2 Gbytes is used. This disk drive is used by defining a user data capacity of one block of 1024 bytes. In this case, there are a total of 2270625 blocks numbered 0 to 2270624 in the disk drive. Among these blocks, the user block regions from the block 0 to 2265566 allow reading and writing of data from the host apparatus. The blocks from 2265567 to 2270624 are called the structure control information region.

Figure 2A:
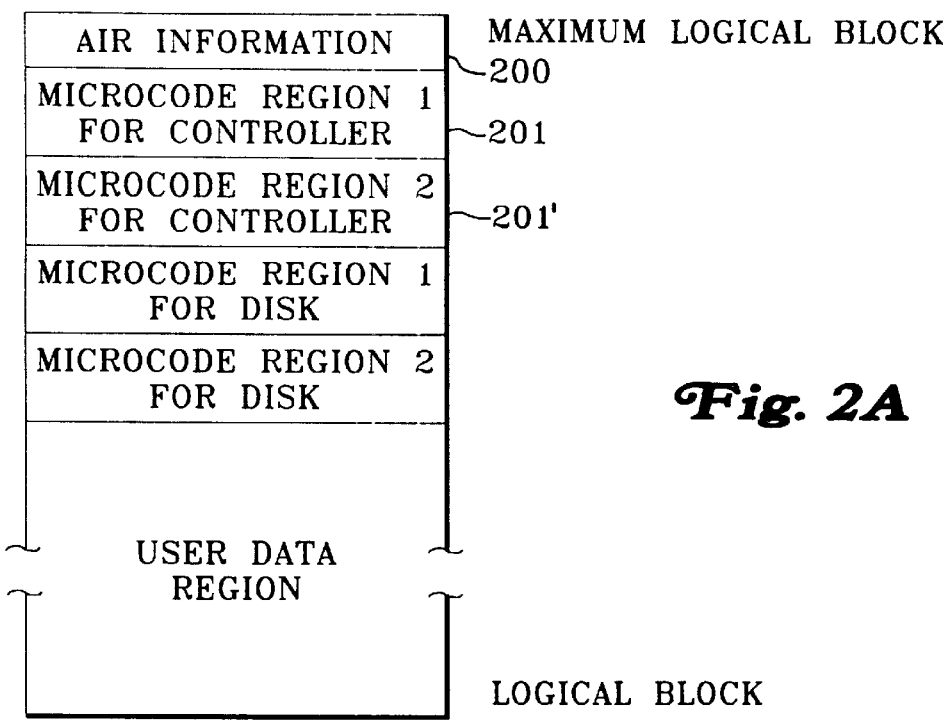
FIGS. 2A and 2B are diagrams showing structure control information and AIR information for the apparatus of FIG. 1.

FIG. 2A shows a structure control information region. The structure control information region stores a control microcode 201 of the disk array apparatus or the like in addition to an AIR information 200.

Figure 2B:
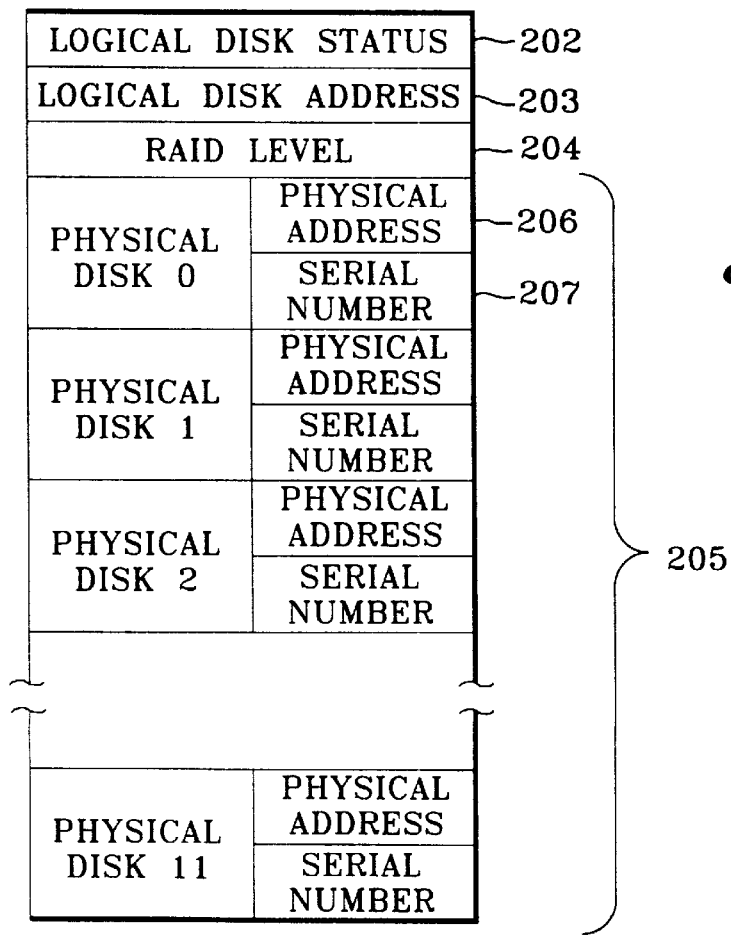

Details of the AIR information are shown in FIG. 2B. The AIR information includes logical disk status 202 indicating the status of a logical disk, logical disk address 203 indicating the logical disk number to which the relevant physical disk belongs, RAID level 204 indicating the RAID level of the logical disk to which the relevant physical disk belongs, logical groups information 205 indicating the physical position in the drive module group of all CDs forming the logical disk to which the relevant disk apparatus belongs, physical address 206 indicating the physical position in the drive module group to which CDs are respectively inserted, and serial numbers 207 for each CD. The array controller recognizes and controls the combinations of logical disks from the relevant AIR information and serial numbers recorded in the disk apparatus.

In addition, the position information for the drive module stored in the disk apparatus for responding to instructions from the host apparatus can be changed so that maintenance apparatus can be connected to a maintenance interface provided in the array controller.

The structure information recorded in the disk apparatus is used by the array controller to determine the validity of the disk apparatus inserting position. Namely, this structure information is used to recognize logical disk conditions when multiple combinations of physical disks form logical disks in the drive module group. Therefore, the relevant structure information includes "physical address" information indicating position in the drive module group to which the disk apparatus is inserted, "combination information" indicating the logical position of the relevant disk in the logical disk to which the relevant disk belongs, "logical disk address" of the logical disk to which the relevant disk belongs, "physical position" of all disk apparatus forming the logical disk to which the relevant disk belongs, and "serial number".

The array controller can change the contents of the "physical address" using a "function to change position information or to invalidate position information" command. The "function to change position information" provided in the array controller changes the "physical address" to the position where the relevant disk apparatus is inserted when the disk apparatus is transposed (or moved). In this manner, mismatching between structure information and inserting position can be eliminated to avoid disabling the relevant disk apparatus.

Here, it is assumed that timing for changing the "physical address" is given not only from the maintenance tool but also from the host apparatus. In this case, the structure information can be changed by utilizing a "function to change structure information" with an instruction from the host apparatus or a "function to recognize invalid structure information" with an instruction from the host apparatus. This method enhances safety and uniformity of the transposition work to improve the maintenance capability of the disk array apparatus.

Two transposition modes will be considered here, namely, transposition in the same cluster and transposition between different clusters.

When a logical disk is transposed within the same cluster, the inserting positions of the physical disks which make up the logical disk are changed. This is often executed for the disk array apparatus. Therefore, it is desirable for the host apparatus to know that the structure of the disk array apparatus appears not to have generated any change before or after transposition of the disk apparatus. When the host apparatus specifies data in the disk array apparatus, the logical disk address is generally used. From this fact, it can be seen that the logical address of the transposed logical disk must be stored before and after the transposition.

Meanwhile, the situation is different when the logical disk is transpositioned or moved between different clusters. When the logical disk is moved, it is often intended to change the structure of the disk array system as a whole. In that case, it is unnecessary to store the logical disk address of the particular logical disk. Moreover, if several sets of logical disks already exist in the cluster which is the transposition destination, it is a problem because a plurality of logical disks having the same logical disk addresses already exist in the one drive module group. Such a situation, however, is inconvenient because the disk array apparatus cannot accurately control the logical disk to be controlled.

As explained above, when the logical disk is transpositioned within the same cluster, the logical disk address must be stored. When the logical disk is transpositioned between different clusters, the logical disk address must be set again.

The operation of the modes explained above will now be explained. The array disk apparatus receives, from the host apparatus, an instruction to change the logical disk status to "Enable" for a certain logical disk. In this case, the disk array apparatus updates the physical address stored in the structure information to the current inserting position for each physical disk forming the relevant logical disk. The disk array apparatus updates the positions of physical addresses of all physical disks formed as one relevant logical disk to the current inserting position. Finally, the disk array apparatus updates the logical disk status to "Enable" and rewrites the updated value to the relevant physical disk. After the structure information is updated, the disk array apparatus then accepts the access from the host apparatus.

In another case, the disk array apparatus receives an instruction from the host apparatus to change the logical disk status to "Move" or "Portable" for a certain logical disk. In this case, the disk array apparatus inhibits subsequent acceptance of access from the host apparatus. Thereafter, the disk array apparatus updates, for each physical disk forming the relevant logical disk, the logical disk status stored in the structure information to "Move" or "Portable" with the "function to erase only the position information". Finally, the disk array apparatus updates the structure information by rewriting the updated value into the relevant physical disk.

If it becomes necessary to transpose the rank of the disk array apparatus within the same cluster, the disk array apparatus receives an instruction issued by the host apparatus to change the status of the relevant rank to "Move". The disk array apparatus executes the process explained above upon reception of the relevant instruction. Thereafter, the disk array apparatus inhibits acceptance of access issued by the host apparatus. Finally, the disk array apparatus changes the logical disk status of the object rank to "Move".

An operator confirms that the rank status is "Move" from the maintenance tool or an LED display or the like provided on the physical disk apparatus. Thereafter, the object rank is removed from the cabinet and the relevant rank is inserted into the slot of the transposition destination.

Upon completion of insertion of the relevant rank, the host apparatus issues an instruction to the disk array apparatus to change the status to "Enable". The disk array apparatus executes the process explained above upon reception of the relevant instruction to change the object rank status to "Enable". In this manner, transposition of rank in the same cluster is completed and thereafter access to the logical disk is started again.

Next, transposition of rank, when it is required, to a different cluster will be briefly explained. In this case, the host apparatus first sends an instruction to the disk array apparatus to change the relevant rank status to "Portable". Upon reception of the relevant instruction, the disk array apparatus executes the processing explained above. The disk array apparatus inhibits acceptance of access from the host apparatus and thereafter changes the logical disk status of the object rank to "Portable".

An operator can confirm that the rank status is "Portable" from the maintenance tool or LED display or the like provided on the disk apparatus. Thereafter, the object rank is removed from the cabinet and it is then inserted into the other cluster as the transposition destination. Processing and operation after completion of insertion of the relevant rank are similar to that for rank transposition in the same cluster.

With the operation explained above, transposition of rank in different clusters can be completed and thereafter access to the logical disk can also be started again. Moreover, extension of logical disks can be realized by newly adding disks for which the logical disk status recorded in the structure information is "Portable". An operator inserts the logical disk for extension into the object cluster. The host apparatus issues an instruction to change the status of the relevant logical disk to "Enable". After that, operation is similar to that for transposition of rank. With the operation explained above, extension of rank is completed.

Next, fault diagnosis of the disk array apparatus of this invention will be briefly explained. For example, assume that access to rank 0 has been completed erroneously with a certain failure. Usually, the failure is reported to the host apparatus as sense information. Therefore, detailed failure analysis can be obtained by analyzing the relevant sense information. When it has been proved, as a result of analysis, that a failure could be related to a particular disk apparatus and the error is generated during transfer of data, it is difficult for an operator to judge whether the cause lies in the physical disk itself or in the cabinet connector to which the physical disk is inserted.

In this case, since replacement of the disk apparatus is rather easy, the relevant physical disk is replaced with a new disk apparatus to observe whether or not a failure is generated again. However, if the cause of failure lies in the cabinet connector, the relevant failure is generated again even after the physical disk is replaced, as explained above. In that case, replacement of the physical disk has been useless, wasting cost and time.

In the disk array apparatus of the present invention, if other vacant slots exist within the disk array apparatus, an operator can transpose the slot of the logical disk having generated a failure to any one of the relevant vacant slots to survey whether or not a similar failure is generated. If a failure still occurs, the operator conveniently judges that the fault lies in the disk apparatus and if a failure does not occur, the operator judges that the fault lies in the connector side.

Moreover, from the viewpoint of operation, transposition of the logical disk is required in some cases for the purpose of changing the system configuration. In that case, dispersion of a load of data sets, for example, is often considered. Therefore, transposition of logical disks is usually carried out in different clusters.

In such a case, it is rare that the structure of clusters as the transposition origin is equal to the structure of clusters as the transposition destination. Therefore, it is preferable that the structure after transposition not be restricted by the structure before transposition.

Even in this case, according to the present invention, contradiction between the AIR information before transposition and the actual inserting information can be prevented as in the case when the transposition is within the same cluster. Therefore, even in the case of transposition of the logical disk to a different cluster, an operator is capable of freely determining the inserting position of the transposition destination. As a result, quick work can be expected because the work which requires a long time, such as copying a large data set in the volume, is no longer required.

Sometimes the number of logical disks is set to half of the maximum number of disks to be mounted in the structure before delivery, and then the logical disks are extended as required. The structure information of the logical disks is stored at the time of delivery from the factory. However, since the logical disk and physical position may be controlled separately, there is no need to take care of the actual inserting position. That is, there is no need to regenerate the structure information of the new logical disk for each user structure at the time of delivery from the factory, which improves productivity.

FIG. 1 is a block diagram showing a structure of the disk array apparatus. The disk array apparatus 100 includes array controllers 101, 101' and a drive module group 102. The array controllers 101, 101' are operatively connected to the drive module group 102. Moreover, the array controllers 101, 101' are capable of accessing all CD's 905 in the drive module group 102.

The array controllers 101, 101' accept commands issued from the host apparatus 103, analyze the commands, and control the positioning of the logical disk required and data transfer between the relevant disk and host apparatus. In this embodiment, the host apparatus and disk array apparatus are controlled on the basis of the SCSI interface rule.

In the drive module group 102, each vertical column is termed a port, while each horizontal row is termed a rank. Therefore, the card drive in one cluster can be uniquely identified by the rank number and port number.

When the power switch of the disk array apparatus is turned on, the array controllers 101 and 101' select the desired CD 905 to read the array controller control microcode 201 and AIR information 200 in the structure control region stored in the relevant CD. Upon completion of reading the array controller control microcode 201, the array controllers 101, 101' control on the basis of the relevant microcode.

The disk array controller initializes registers or the like on the basis of the microcode explained above. After completion of initialization, the disk array controller refers to the AIR information 200 included in the control information in the structure control region already read. The disk array controller recognizes the structure of the controllable CD 905 from the AIR information 200 already read.

Unless a particular instruction is issued, the array controllers 101, 101' do not read the data in the structure control region again after the power switch is turned on. If the array controllers 101, 101' are required to make reference to the information in the relevant region, the controllers refer to the data already read, for high speed processing.

Here, in order to indicate the AIR information and serial number of each physical disk in this specification, the above information is expressed as (logical disk status, RAID level, logical disk address, physical address and serial number (rank/port/serial number), and physical address and serial number (rank/port/serial number) of all of the disk apparatus belonging to the logical disk group). For example, the following description (Enable, 5, 1, 2/0/91, 2/0/91, 2/1/92, 2/2/93, 2/3/94, 2/4/95) indicates that the logical disk status is Enable, the RAID level is set to 5, the physical disk address is 1, the physical address is rank 2, port 0, and the serial number is 91. Moreover, the physical address and serial number of all physical disks forming the logical disk to which the physical disk belongs also indicates that rank 2 includes serial number 91 in port 0, serial number 92 in port 1, serial number 93 in port 2, serial number 94 in port 3, and serial number 95 in port 4.

In addition, in this embodiment, a "Mode Select" command defined by the SCSI interface rule is used as the instruction issued to the disk array apparatus from the host apparatus. The relevant command is then used to set detailed rules and protocols for the interface for the disk apparatus from the host apparatus. In this instruction, a plurality of kinds of parameters are transferred following the command, including information called "Vender Unique". This information stores the object logical disk address which is required to change the logical disk status. In this embodiment, the "Mode Select" command is used for changing the logical disk status. However, it is also possible to use other commands unless they conflict with other interface rules or protocols.

Figure 3A:
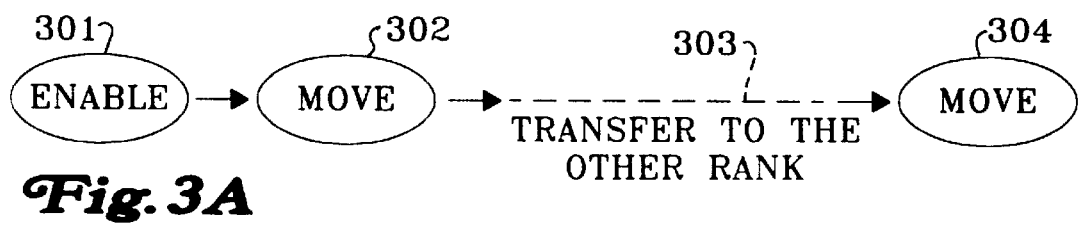
FIGS. 3A, 3B and 3C are diagrams showing status transition of logical disk status for transposition and extension of the logical disk.
Figure 3B:
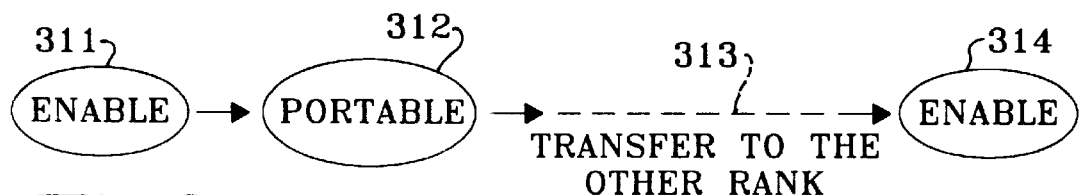
Figure 3C:
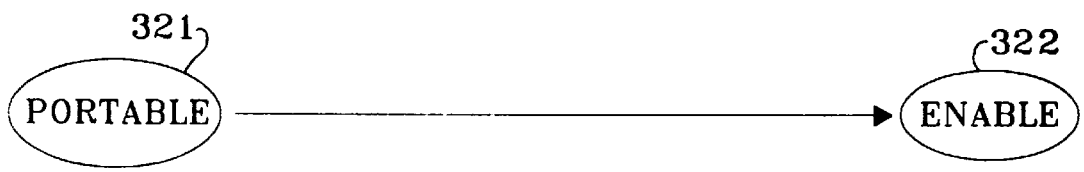
Figure 4A:
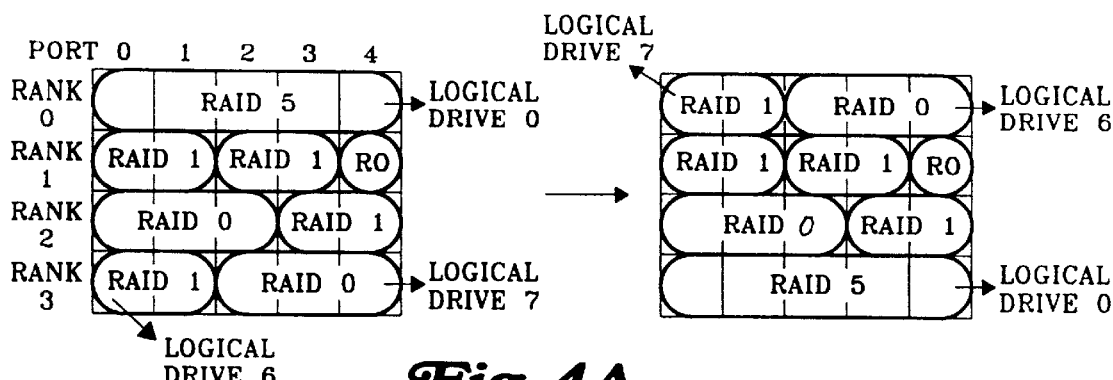
FIGS. 4A, 4B and 4C are diagrams showing change of the structure of clusters during transposition and extension of the logical disk.
Figure 5A:
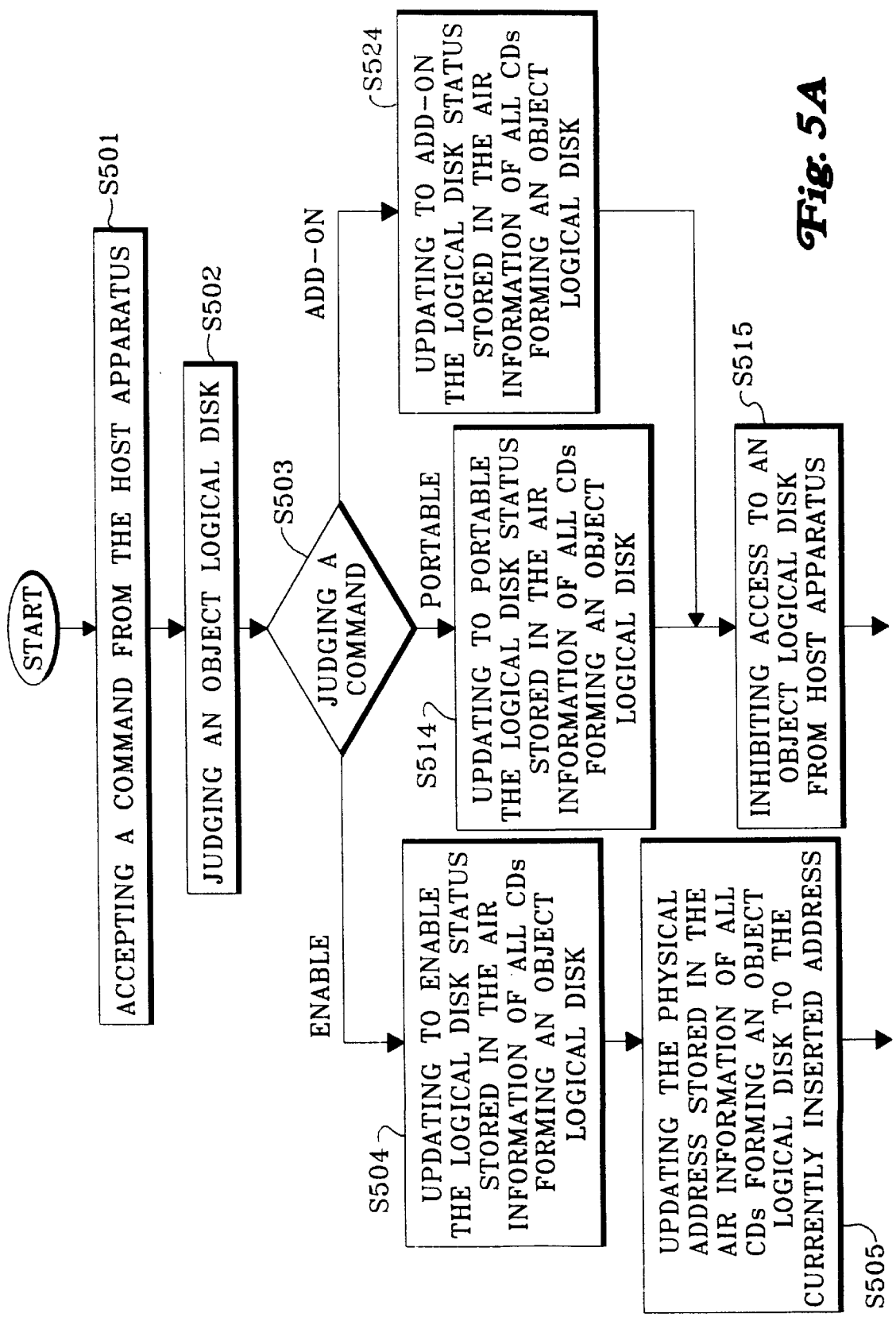
FIG. 5 shows the arrangement of FIGS. 5A and 5B, FIGS. 5A and 5B are a processing flow chart of an array controller when the logical disk status change request from the host apparatus is accepted.
Figure 7A:
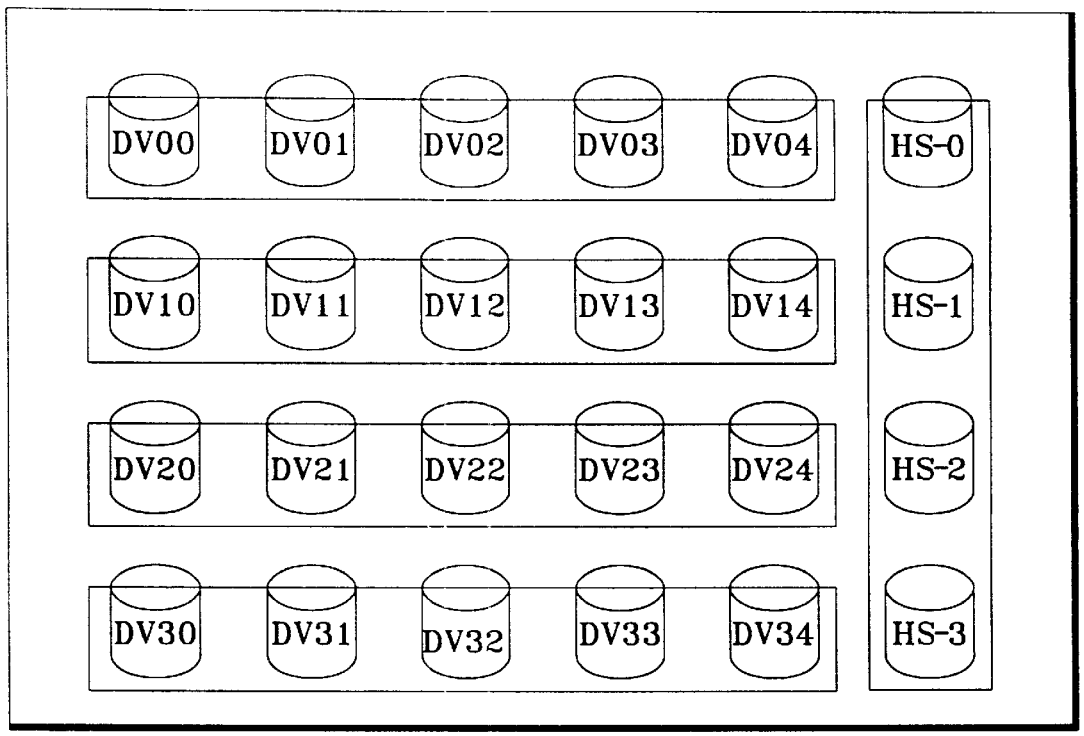
FIGS. 7A and 7B are diagrams showing an assignment of logical disks and the RAID mode of each logical disk.
Figure 7B:
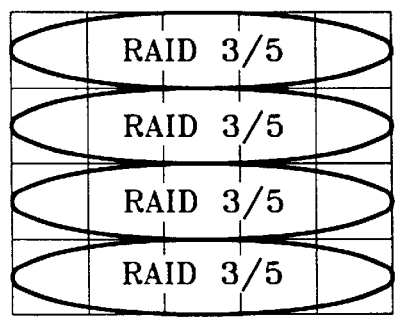
Figure 8A:
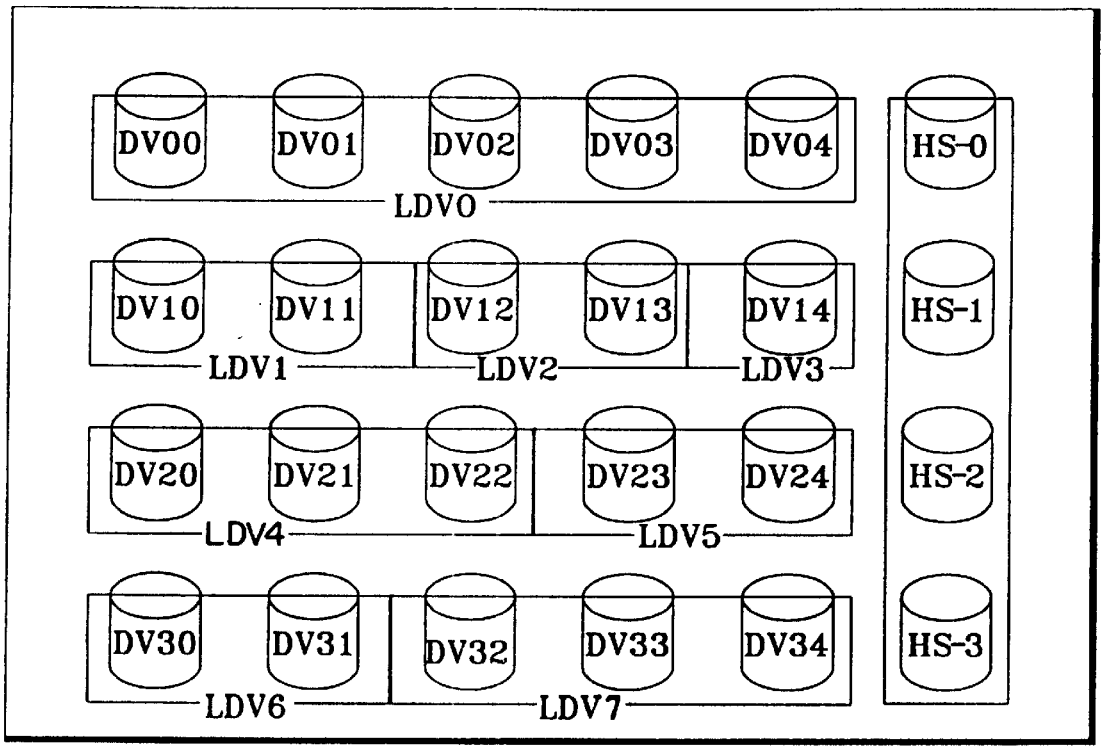
FIGS. 8A and 8B are diagrams showing an assignment of logical disks and the RAID mode of each logical disk.
Figure 8B:
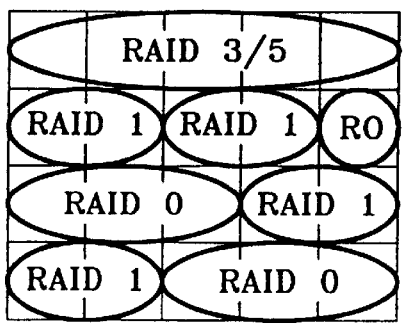

Next, operations for transpositioning the logical disks to different ranks in the same cluster so that the clusters structured as indicated in the left side of FIG. 4A are changed to have the structure on the right side of FIG. 4A will be explained with reference to FIG. 3, FIG. 5 and FIG. 6. FIG. 3A shows status transition of logical disk status when the logical disk structure is rearranged or transpositioned. FIG. 5 and FIG. 6 show the processing flows.

The AIR information of each card drive before transposition is indicated below. The value indicated by the asterisk mark (*) may take a desired value.

Logical disk 0:
R0/P0 CD: (Enable, 5, 0, 0/0/00, 0/0/00, 0/1/01, 0/2/02, 0/3/03, 0/4/04);
R0/P1 CD: (Enable, 5, 0, 0/1/01, 0/0/00, 0/1/01, 0/2/02, 0/3/03, 0/4/04);
R0/P2 CD: (Enable, 5, 0, 0/2/02, 0/0/00, 0/1/01, 0/2/02, 0/3/03, 0/4/04);
R0/P3 CD: (Enable, 5, 0, 0/3/03, 0/0/00, 0/1/01, 0/2/02, 0/3/03, 0/4/04);
R0/P4 CD: (Enable, 5, 0, 0/4/04, 0/0/00, 0/1/01, 0/2/02, 0/3/03, 0/4/04).
Logical disk 6:
R3/P0 CD: (Enable, 1, 6, 3/0/10, 3/0/10, 3/1/11);
R3/P1 CD: (Enable, 1, 6, 3/1/11, 3/0/10, 3/1/11).
Logical disk 7:
R3/P2 CD: (Move, 0, 7, */*/20, */*/20, */*/21, */*/22);
R3/P3 CD: (Move, 0, 7, */*/21, */*/20, */*/21, */*/22);
R3/P4 CD: (Move, 0, 7, */*/22, */*/20, */*/21, */*/22).

Moreover, the logical disk status is in the "Enable" status 301 in FIG. 3A.

First, the host apparatus issues an instruction to change the status of the logical disk 0 to "Move". The subsequent processing flow is shown in FIG. 5. The array controller 101 receives the relevant command (S501). The array controller 101 analyzes the command received and recognizes, as a result of analysis, that the object is the logical disk 0. The array controller 101 searches the AIR information 200 (FIG. 2A) of all CD's 905 (FIG. 9) existing in the cluster 908 to find the CD's 905 forming the logical disk 0 (S502)(FIG. 5).

Moreover, the array controller 101 also recognizes that an instruction to change the status of the relevant logical disk to Move has been issued (S503). In this timing, the AIR information 200 of the logical disk 0 is as explained above.

Since the array controller 101 recognizes that the status of the object logical disk (logical disk 0) has been changed to "Move", the content of the logical disk status 202 stored in the AIR information 200 of each CD 905 which is read when the power switch is turned on is changed to "Move" (S504). The AIR information 200 in this timing is as follows:

Logical disk 0:
R0/P0 CD: (Move, 5, 0, */0/00, */0/00, */1/01, */2/02, */3/03, */4/04);
R0/P1 CD: (Move, 5, 0, */1/01, */0/00, */1/01, */2/02, */3/03, */4/04);
R0/P2 CD: (Move, 5, 0, */2/02, */0/00, */1/01, */2/02, */3/03, */4/04);
R0/P3 CD: (Move, 5, 0, */3/03, */0/00, */1/01, */2/02, */3/03, */4/04);
R0/P4 CD: (Move, 5, 0, */4/04, */0/00, */1/01, */2/02, */3/03, */4/04).

The array controller 101 inhibits subsequent access to the relevant logical disk in preparation for removal of the logical disk 0 (S515). The "function to change the position information" with the instruction from the host apparatus or "function to make the position information invalid" with the instruction from the host apparatus provided in the array controller 101 writes back the updated AIR information 200 to the object logical disk (S516). Moreover, if necessary, the array controller 101 sends a message to the array controller 101' of the other system that the AIR information has been updated (S517). Thereby, the relevant logical disk is set to the "Move" status, and the relevant logical disk can be removed. The status of the logical disk in this timing is indicated in FIG. 3A as 302.

Next, the instruction to change the status of the logical disk 6 to "Move" is issued from the host apparatus. Processing similar to that in the case of the logical disk 0 is also executed for the logical disk 6. The AIR information 200 of the logical disk 6 is updated as indicated below.

Logical disk 6:
R3/P0 CD: (Move, 1, 6, */0/10, */0/10, */1/11);
R3/P1 CD: (Move, 1, 6, */1/11, */0/10, */1/11).

In regard to the logical disk 7, it is assumed to be in the "Move" status, so particular processing is not required.

Next, upon recognition that the logical disks 0, 6 and 7 are all in the "Move" status, an operator removes the object CD 905 from the slot. Additional CD's 905 may also be removed from each position in which the logical disk status is "Move". However, in this embodiment, the object CD's 905 are all removed. Thereafter, each logical disk is loaded to its new slot according to its designated transposition destination. In this timing, the status of the logical disk is in the status shown in FIG. 3A at 303.

The processing flow executed when the CD's 905 are newly inserted is shown in FIG. 6. The array controllers 101 and 101' detect that CD 905 is newly inserted (S601), and then the array controllers 101 and 101' read the structure control information including the AIR information 200 of the relevant CD 905 (S602).

Upon completion of read operations, the array controllers 101 and 101' check that there is no contradiction in the logical disk status 202, RAID level 204 and logical disk group 205 in the AIR information 200 (S603).

When contradiction is detected, the array controllers 101 and 101' complete defective processings, assuming that an artificial serial number problem such as erroneous selection of the CD 905 forming the logical disk has been generated (S614).

If a fault is not detected, the array controllers 101 and 101' refer to the logical disk status 202 in the AIR information 200. The array controllers 101 and 101' select, from the content of the logical disk status 202, the processing to be done next. Since the current logical disk status 202 is "Move", the array controllers 101 and 101' complete the operation without execution of any processing (S604). As explained above, processing of the array controller is to be executed when CD 905 is inserted.

Next, the host apparatus issues an instruction to change the status of the logical disks 0, 6 and 7 to "Enable" in order to make it possible to use the logical disks as transpositioned. In this embodiment, it is assumed for convenience that the status change instruction has been issued first to the logical disk 0. Subsequent processing is shown in FIG. 5.

The array controller 101 receives the status change instruction to the logical disk 0 (S501), and recognizes that the processing object is the logical disk 0. The array controller 101 retrieves the AIR information 200 of all CD's 905 existing in the cluster 908 to find all CD's 905 forming the logical disk 0 (S502). In this operation, since the logical disk 0 is newly transpositioned to the rank 3, the object CD 905 becomes DV30, DV31, DV32, DV33, DV34. When retrieval is completed, the array controller 101 recognizes that the command accepted from the host apparatus is the "Enable" instruction and selects additional processing (S503).

The array controller 101 changes the content of the logical disk status stored in the AIR information of each CD read when CD's are inserted to "Enable" in regard to the CD's 905 forming the logical disk 0 (S504).

Moreover, the array controller 101 updates the physical address stored in the AIR information 200 to the position to which CD 905 is currently inserted (S505). In addition, the array controller 101 stores the physical address of the other CD's 905 belonging to the relevant logical disk to the logical disk group information 905 (S506).

The "function to change position information with the instruction from the host apparatus" provided in the array controller 101 writes the relevant AIR information 200 back to all of the CD's 905 when the AIR information is updated (S507). The AIR information 200 stored in the CD905 after the writing back becomes as follows:

Logical disk 0:
R0/P0 CD: (Enable, 5, 0, 3/0/00, 3/0/00, 3/1/01, 3/2/02, 3/3/03, 3/4/04);
R0/P1 CD: (Enable, 5, 0, 3/1/01, 3/0/00, 3/1/01, 3/2/02, 3/3/03, 3/4/04);
R0/P2 CD: (Enable, 5, 0, 3/2/02, 3/0/00, 3/1/01, 3/2/02, 3/3/03, 3/4/04):
R0/P3 CD: (Enable, 5, 0, 3/3/03, 3/0/00, 3/4/04);
R0/P4 CD: (Enable, 5, 0, 3/4/04, 3/0/00, 3/1/01, 3/2/02 , 3/3/03, 3/4/04).

Thereafter, the array controller 101 sends a message to array controller 101' of the other system informing it that the AIR information 200 has been updated (S508).

With the processing explained above, transposition of the logical disk has been completed. Finally, the array controller 101 allows access to the logical disk 0 from the host apparatus (S509). In this timing, the status shown in FIG. 3A 304 is generated.

Subsequently, similar processing is carried out for the logical disks 6 and 7 and the AIR information 200 is written back to the CD 905. The AIR information 200 stored in the CD 905 after the writing back becomes as follows:

Logical disk 6:
R3/P0 CD: (Enable, 1, 6, 0/0/10, 0/0/10, 0/1/11);
R3/P1 CD: (Enable, 1, 6, 0/1/11, 0/0/10, 0/1/11).
Logical disk 7:
R3/P2 CD: (Enable, 0, 7, 0/2/20, 0/2/20, 0/3/21, 0/4/22);
R3/P3 CD: (Enable, 0, 7, 0/3/21, 0/2/20, 0/3/21, 0/4/22);
R3/P4 CD: (Enable, 0, 7, 0/4/22, 0/2/20, 0/3/21, 0/4/22).

Thereafter, the array controller 101 allows access to the logical disks 6, 7 from the host apparatus to complete the transposition of the logical disk.

Embodiment 2

Figure 4B:
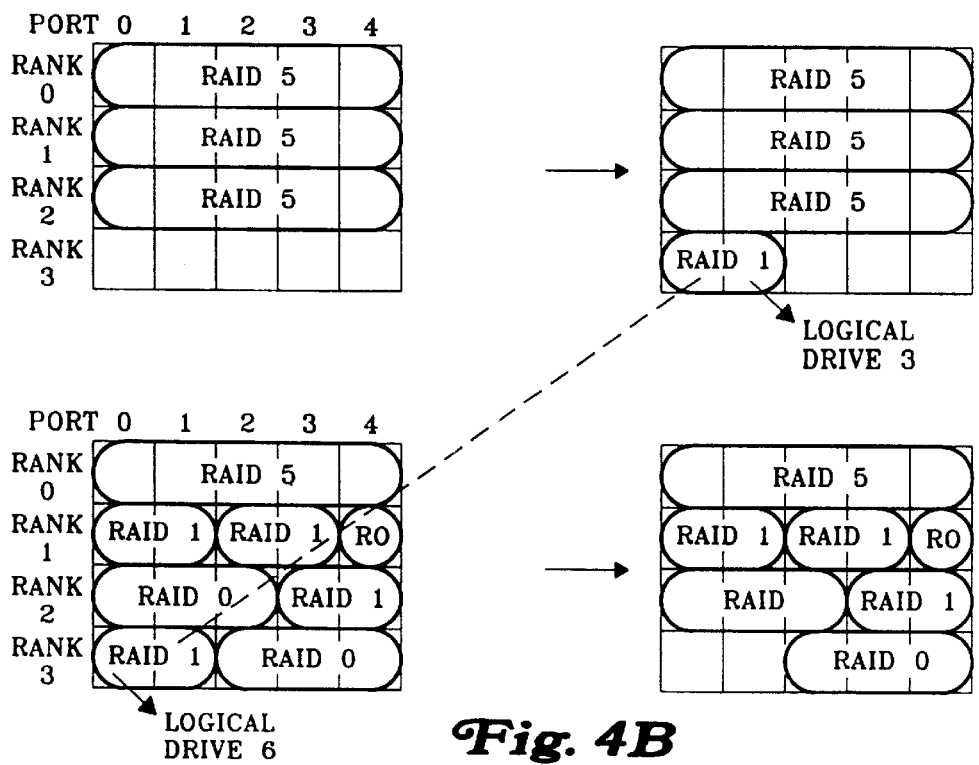

Next, the structure shown in FIG. 4B will be explained. The structure shown on the right side of FIG. 4B is obtained by transferring the logical disk 6 in the cluster 908 structured and shown in the left lower side of FIG. 4B to the rank 3 of the cluster 908 structured and shown in the left upper side of FIG. 4B. That is, transposition of logical disks between different clusters will be explained by referring to FIG. 3, FIG. 5 and FIG. 6.

FIG. 3A shows the status transition changes of the logical disk status 902 when a logical disk is transpositioned to a different cluster 908. FIG. 5 and FIG. 6 show the related processing flows.

The AIR information 200 of each card drive before the transposition is indicated below:
Cluster 0/logical disk 6:
R3/P0 CD: (Enable, 1, 6, 3/0/30, 3/0/30, 3/1/31);
R3/P1 CD: (Enable, 1, 6, 3/1/32, 3/0/30, 3/1/31).

Moreover, the logical disk status 202 in this timing is in the status shown at 311 of FIG. 3B.

First, the host apparatus issues the instruction to change the status of logical disk drive 6 to "Portable". The subsequent processing flows are shown in FIG. 5. The array controller 101 accepts the relevant command (S501), and then the array controller 101 further analyzes the accepted command and recognizes that the object is the logical disk 6. Here, the array controller 101 retrieves the AIR information 200 of all CD's 905 existing in the cluster 908 to find the CD's 905 forming the logical disk 6 (S502).

The content of the AIR information 200 in this timing is as explained above. The array controller 101 recognizes that it is now instructed that the status of the object logical disk (logical disk 6) is to be changed to "Portable" (S503). The array controller 101 then changes the content of the logical disk status 202 stored in the AIR information 200 of the CD 905 read when the power supply is turned on to "Portable" (S524). The AIR information 200 in this timing is indicated below:
Cluster 0/logical disk 6:
R3/P0 CD: (Portable, 1, *, */0/30, */0/30, */1/31);
R3/P0 CD: (Portable, 1, *, */1/31, */0/30, */1/31).

The array controller 101 inhibits subsequent access to the relevant logical disk in preparation for removal of CD 905 (S515).

The "function to change position information with the instruction from the host apparatus" or "function to invalid position information with the instruction from the host apparatus" provided in the array controller 101 writes the updated AIR information 200 back to the object logical disk (S526).

Moreover, if necessary, the array controller 101 sends a message to the array controller 101' of the other system informing it that the AIR information 200 has been updated to instruct rewriting of the AIR information 200 (S527).

With the processes explained above, the relevant logical disk is set to the "Portable" status, and the relevant logical disk can be removed. The logical disk status 202 in this timing is in the status shown at 312 in FIG. 3B.

Next, an operator recognizes that the relevant logical disk is in the "Portable" status and then removes the object CD's 905 from the cluster 908. The removed CD's 905 are then loaded to the selected cluster 908 as the transposition destination. In this timing, the logical disk status is in the status of 312 in FIG. 3B.

The processing flows to be executed when CD 905 is newly inserted are shown in FIG. 6. The array controllers 101 and 101' detect that CD905 is newly inserted (S601).

Then, the array controllers 101 and 101' read the structure control information including the AIR information 200 of the relevant CD 905 (S602). Upon completion of the read operation, the array controllers 101 and 101' verify that there is no contradiction or conflict in the logical disk status 202, RAID level 203 and logical disk group 205 in the AIR information 200 (S603). If a conflict is detected, the array controllers 101 and 101' erroneously complete the processing, assuming that a problem such as erroneous selection of a CD 905 forming the logical disk has been generated (S614).

When a fault is not detected, the array controllers 101 and 101' refer to the logical disk status 202 in the AIR information 200 to select the processing to be executed next (S604).

The array controllers 101 and 101' recognize that the logical disk status 202 is "Portable". Therefore, the array controllers 101 and 101' recognize that the logical disk is transpositioned from the other cluster 908 and the disk apparatus are then inserted. Here, the array controllers 101 and 101' retrieve the AIR information 200 for all CD's 905 stored in the cluster 908, to find out the maximum logical disk number assigned in the relevant cluster 908 (S605).

The array controller 101 assigns, to the transpositioned logical disk, the logical disk number which is larger by one than the maximum logical disk number assigned in the relevant cluster 908, because overlap of the logical disk address 903 in one cluster 908 must be avoided. The array controller 101 updates the logical disk address 203 in the AIR information 200 read when the relevant CD is inserted for all CD's 905 forming the logical disk inserted (S606).

Finally, the "function to change position information" stored in the array controller 101 updates the relevant information in the AIR information 200 of the relevant logical disk (S607). The AIR information 200 stored in each updated CD 905 is then as follows:

Cluster 1/logical disk 3:
R3/P0 CD: (Portable, 1, 3, */0/30, */0/30, */1/31);
R3/P1 CD: (Portable, 1, 3, */1/31, */0/30, */1/31);

Next, the host apparatus issues the instruction to change the logical disk status 202 to "Enable" to continue processing. However, processing after the logical disk is inserted is similar to that explained in connection with embodiment 1.

The AIR information 200 after completion of processing is as follows:
Cluster 1/logical disk 3:
R3/P0 CD: (Enable, 1, 3, 3/0/30, 3/0/30, 3/1/31);
R3/P1 CD: (Enable, 1, 3, 3/1/31, 3/0/30, 3/1/31).

Here, transposition of the logical disk has been completed. In this timing, the logical disk status 202 is as shown at 314 in FIG. 3B.

Embodiment 3

Figure 4C:
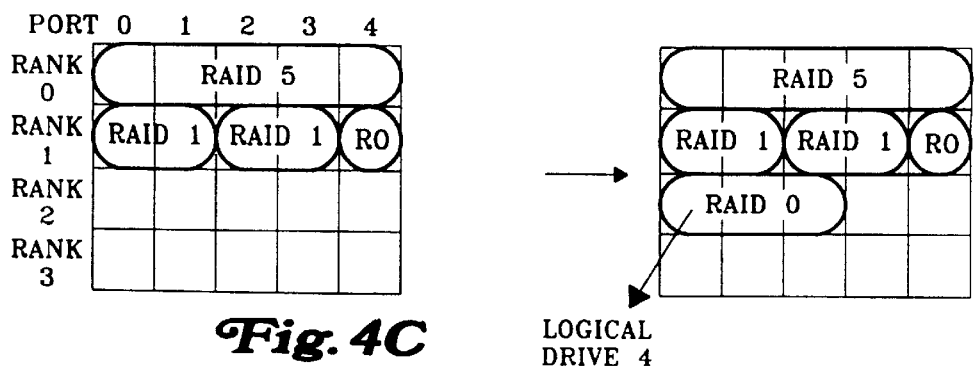

Next, operations for extending the logical disks so that the logical disk 4 has the structure shown in FIG. 4C will be explained. In FIG. 4C, the logical disk number 4 is added to port 0 and port 1 of rank 2 of the cluster 908.

FIG. 3C shows status transition of the logical disk status 202 when the logical disk is extended, from a "Portable" status at 321 to an "Enable" status at 322. FIG. 5 and FIG. 6 show the processing flows.

The AIR information 200 in each CD 905 before transposition is as follows:
Logical disk for extension:
CD to be inserted to R2/P0:
  (Portable, 0, *, */0/40, */0/40, */1/41, */2/42);
CD to be inserted to R2/P1:
  (Portable, 0, *, */1/41, */0/40, */1/41, */2/42);
CD to be inserted to R3/P1:
  (Portable, 0, *, */2/42, */0/40, */1/41, */2/42).

Processing for extending the logical disk is similar to the case where the relevant logical disk is inserted to the duster 908 as the transposition destination in the transposition of disks between different clusters 908.

Embodiment 4

When the port position to which CD 905 forming the relevant logical disk is inserted is the same before and after the transposition of disks, there is no need to provide the combined information in the relevant logical disk within the AIR information 200. Therefore, although reliability for recognizing the logical disk after the transposition is lower, the present invention can realize an object disk array apparatus through more simplified control.

Advantages of the Invention

The many advantages of this disk array apparatus are self-apparent. The invention enables transposition of logical disks between clusters in every structure and within the same clusters. Therefore, since it is possible to execute a failure simulation test after the relevant logical disk is transpositioned to another rank in the fault location process when a fault is generated, for example, in the logical disk transposition system, quick and accurate fault recovery processing can be executed.

Moreover, since rearrangement work of data sets can be realized in the computer system without copying the volume, time and cost can be greatly saved.

In addition, even in the case of newly extending the logical disks, there is no restriction on the physical addresses available for insertion of the relevant disks. Accordingly, it is not necessary to generate the logical disk corresponding to each structure of different array disks for each user. As a result, production control and stock control for the logical disks for extension can be simplified to remarkably improve productivity.

The invention can accurately recognize again, at the time of the transposition of logical disk, the relevant logical disk after the transposition, even when the relative position of the disk apparatus forming the relevant logical disk is changed. That is, highly reliable disk array apparatus can be realized. In addition, the stress of the person in charge of the system can be reduced. The invention also achieves integrated maintenance by giving the timing for change of logical disk status from the host apparatus, which simplifies procedures and management of maintenance work.

As explained above, the present invention enables free change of structure of logical disks in view of realizing the disk array apparatus having excellent maintenance ability, productivity and reliability.

While the principles of the invention have been described above in connection with specific apparatus and applications, it is to be understood that this description is made only by way of example and not as a limitation on the scope of the invention.

I claim:

1. A disk array apparatus comprising:
   a drive module group formed of a plurality of disk apparatus for storing data to be transferred to/from a host apparatus, and additional disk apparatus for storing redundant data generated from the data stored in said plurality of data storing disk apparatus; and
   at least one array controller for accepting instructions issued by said host apparatus to analyze the contents thereof, changing a status of selected said disk apparatus depending on the instruction issued by the host apparatus, said at least one array controller also controlling data transfer between said host apparatus and disk apparatus;

wherein said drive module group is formed of a plurality of logical disks, each said logical disk including selected ones of said plurality of disk apparatus;

each said disk apparatus having structure information, including position information for all of said plurality of disk apparatus in at least said logical disk of said selected disk apparatus;

said structure information further including combination information indicating the positions of said disk apparatus in each of said logical disks and the logical disk to which said disk apparatus belong;

said array controller having a function to inhibit use of a particular disk apparatus when the position information within said structure information recorded in said particular disk apparatus differs from the actual disk position;

said array controller also having a function to change the position information stored in said disk apparatus;

said array controller further including a function to purge position information included within said structure information stored in said drive module without changing said combination information;

wherein said status change function of said array controller changes said disk status to at least one of an ENABLE status, in which said structure information is completely set and read/write operations to a selected logical disk are permitted, and a MOVE status, in which said structure information is partially set and read/write operations to a selected logical disk are not permitted;

whereby said MOVE status inhibits use of a selected logical disk including each of said selected ones of said plurality of disk apparatus which comprise said selected logical disk.

2. The disk array apparatus of claim 1, wherein said array controller includes a function to change position information in said drive module stored in said disk apparatus depending on an instruction issued from said host apparatus.

* * * * *